(12) United States Patent
Dürre et al.

(10) Patent No.: US 10,876,574 B2
(45) Date of Patent: Dec. 29, 2020

(54) SHAFT BEARING

(71) Applicant: VIBRACOUSTIC GMBH, Darmstadt (DE)

(72) Inventors: Markus Dürre, Neuenburg am Rhein (DE); Christian Paul, Auggen (DE)

(73) Assignee: VIBRACOUSTIC GMBH, Darmstadt (DE)

(*) Notice: Subject to any disclaimer, the term of this patent is extended or adjusted under 35 U.S.C. 154(b) by 0 days.

(21) Appl. No.: 16/335,908

(22) PCT Filed: Aug. 16, 2017

(86) PCT No.: PCT/EP2017/070787
§ 371 (c)(1),
(2) Date: Mar. 22, 2019

(87) PCT Pub. No.: WO2018/054620
PCT Pub. Date: Mar. 29, 2018

(65) Prior Publication Data
US 2019/0264739 A1  Aug. 29, 2019

(30) Foreign Application Priority Data
Sep. 26, 2016 (DE) .................. 10 2016 118 157

(51) Int. Cl.
| | | |
|---|---|---|
| F16C 27/04 | (2006.01) | |
| F16C 27/06 | (2006.01) | |
| F16F 1/373 | (2006.01) | |
| F16F 1/38 | (2006.01) | |
| F16F 7/108 | (2006.01) | |
| F16F 15/08 | (2006.01) | |
| F16C 19/06 | (2006.01) | |

(52) U.S. Cl.
CPC .......... *F16C 27/066* (2013.01); *F16F 1/3732* (2013.01); *F16F 1/38* (2013.01); *F16F 7/108* (2013.01); *F16F 15/08* (2013.01); *F16C 19/06* (2013.01); *F16C 2326/06* (2013.01)

(58) Field of Classification Search
CPC ..... F16C 19/06; F16C 27/066; F16C 2326/06
See application file for complete search history.

(56) References Cited

U.S. PATENT DOCUMENTS 4,430,066 A * 2/1984 Benassi .................. B60K 17/24
                                                       464/178
4,551,116 A * 11/1985 Krude .................... F16C 3/026
                                                       464/97

(Continued)

FOREIGN PATENT DOCUMENTS

CN   103375495 A   10/2013
CN   105275983 A   1/2016

(Continued)

OTHER PUBLICATIONS

International Search Report PCT/EP2017/070787, dated Nov. 15, 2017.

(Continued)

*Primary Examiner* — Phillip A Johnson
(74) *Attorney, Agent, or Firm* — Fishman Stewart PLLC

(57) ABSTRACT

A shaft bearing including an inner body, an outer body surrounding the inner body at a distance, and an elastomer body that elastically connects the inner body to the outer body. In embodiments, the elastomer body includes a damping device.

11 Claims, 5 Drawing Sheets

(56) References Cited

U.S. PATENT DOCUMENTS

| | | | |
|---|---|---|---|
| 5,145,025 A | 9/1992 | Damian | |
| 5,501,531 A * | 3/1996 | Hamaekers | B60K 17/24 384/536 |
| 6,422,947 B1 * | 7/2002 | Kelly | F16C 35/077 464/182 |
| 6,948,857 B2 | 9/2005 | Schuetz | |
| 8,961,024 B2 * | 2/2015 | Ikeda | F16C 27/066 384/536 |
| 2002/0176641 A1 | 11/2002 | Schmidt et al. | |
| 2003/0219183 A1 * | 11/2003 | Schuetz | F16C 27/066 384/495 |
| 2011/0133413 A1 * | 6/2011 | Kato | F16C 33/76 277/565 |
| 2013/0068921 A1 * | 3/2013 | Ikeda | F16C 35/04 248/635 |
| 2013/0178298 A1 * | 7/2013 | Hatogai | F16C 3/02 464/179 |
| 2013/0287330 A1 | 10/2013 | Ikeda | |

FOREIGN PATENT DOCUMENTS

| | | |
|---|---|---|
| DE | 4003601 C1 | 8/1991 |
| DE | 4320642 C1 | 1/1995 |
| DE | 10126016 A1 | 12/2002 |
| DE | 102004041426 A1 | 3/2006 |
| EP | 0750131 A1 | 12/1996 |
| EP | 1262672 A2 | 12/2002 |
| EP | 1350971 A2 | 10/2003 |
| EP | 2690305 B1 | 3/2016 |
| JP | 05155263 A * | 6/1993 |
| JP | H05155263 A | 6/1993 |
| JP | H08159154 A | 6/1996 |
| WO | 2006024426 A2 | 3/2006 |

OTHER PUBLICATIONS

CN Search Report 2017800588496, dated May 25, 2020.
Translation of CN Office Action, 201780058849..6, dated May 29, 2020.

* cited by examiner

SHAFT BEARING

CROSS-REFERENCE TO RELATED APPLICATIONS

This application is a National Stage Patent Application of International Patent Application No. PCT/EP2017/070787, filed Aug. 16, 2017, which claims the benefit of German Application Serial No. 10 2016 118 157.9, filed Sep. 26, 2016, the contents of each are incorporated by reference in their entireties.

TECHNICAL FIELD

The present invention relates to a shaft bearing comprising an inner body, an outer body surrounding the inner body at a distance, and an elastomer body that elastically connects the inner body and the outer body to each other.

BACKGROUND

Shaft bearings of the type mentioned in the introduction are used for mounting a cardan shaft of a motor vehicle. The shaft bearing serves for keeping the cardan shaft exactly in position during driving and for compensating axial displacement while starting and braking. Furthermore, the shaft bearing isolates noises and dampens resonance frequencies and wobbling movements of the cardan shaft.

For this purpose, the shaft bearing is coupled to the cardan shaft via the inner body so that vibrations of the cardan shaft are input into the shaft bearing. Thereby, the elastomer body starts to vibrate and dampens and/or isolates the vibrations input into the shaft bearing. The shaft bearing is fixed via the outer body to a motor vehicle component, in particular to the motor vehicle body.

A shaft bearing is disclosed in EP 2 690 305 B1, which has an outer body and an inner body disposed concentrically relative to the outer body, wherein the outer body and the inner body are connected to each other by means of a ring-like elastic spring member.

Further, a shaft bearing is apparent from DE 101 26 016 A1, which has a rolling bearing with an outer body enclosed on the side of the outer circumference, at a radial distance, by a retaining ring, wherein at least one spring body, which is elastically yielding in the axial and radial directions, is disposed in the gap formed by the distance. The outer body is connected to a vibration absorber in a non-rotatable manner relative thereto.

The dynamic stiffness of a shaft bearing increases significantly as soon as the elastomer body oscillates in a flexible natural mode containing larger mass motions in the relevant direction. This increased stiffness may negatively affect the decoupling function of the shaft bearing in the high-frequency range.

SUMMARY

The invention is based on the object of providing a shaft bearing that has an improved stiffness.

A shaft bearing with the features of claim 1 is proposed in order to achieve this object.

Advantageous embodiments of the shaft bearing are the subject matter of the dependent claims.

According to a first aspect of the invention, the shaft bearing comprises an inner body, an outer body surrounding the inner body at a distance, and an elastomer body that elastically connects the inner body and the outer body to each other, wherein the elastomer body has an absorber device.

If the elastomer body is excited to vibrate, the absorber device acts as an absorber and reduces the mass motion in the elastomer body while the absorber device vibrates strongly. Thus, the stiffness, in particular the dynamic stiffness, of the shaft bearing in the target frequency range, which corresponds to the resonance frequency of the absorber device, can be reduced. As a result, the shaft bearing has a sufficient decoupling function even in the high-frequency range. Furthermore, the mass and the frequency of the absorber device can be easily tuned to the problematic range of the elastomer body of the shaft bearing by means of the finite element method. In addition, given a large mass of the absorber device, the dynamic stiffness can be lowered in a targeted manner to less than the natural level in a desired frequency range, so that an approximate "bathtub shape" of the dynamic stiffness curve is produced. The shaft bearing may also be referred to as a cardan shaft bearing.

The inner body may be an inner ring or an outer ring of a rolling bearing, which rotatably supports a cardan shaft. An inner body configured as an inner ring is preferably integrated into the elastomer body by vulcanization. The elastomer body can be fixed to a rolling bearing, which rotatably supports a cardan shaft, by the inner ring. In this case, the inner ring causes a uniform surface pressure on the rolling bearing, and thus a uniform transmission of forces from the rolling bearing onto the shaft bearing. If the inner body is an outer ring of a rolling bearing, the elastomer body is preferably bonded to the inner body by means of a substance-to-substance connection.

The outer body may be an outer ring of bearing support. The shaft bearing is attached to a motor vehicle component via the bearing support. An outer body configured as an outer ring is preferably integrated into the elastomer body by vulcanization. The elastomer body can be fixed to a bearing support by the outer ring. If the outer body is a bearing support, the elastomer body is fixed to the bearing support preferably in a non-positive manner. For this purpose, the elastomer body may be fixed to the bearing support by means of a securing ring.

In an advantageous embodiment, the absorber device is configured as a single-mass oscillator. As a result, the absorber device acts as an additional mass on the elastomer body and, when the elastomer body vibrates, reduces its mass motions while the single-mass oscillator vibrates strongly.

In an advantageous embodiment, the absorber device is connected to the elastomer body by substance-to-substance connection. As a result, the mounting of the absorber device can be almost cost-neutral because the preferred material proportion of the absorber device in the product sales price is very low. Preferably, the absorber device is connected to the elastomer body with material uniformity and integrally.

In an advantageous embodiment, the elastomer body has at least one peripherally extending fold, wherein the absorber device is connected to the at least one fold. The at least one fold is able to absorb an axial and/or radial deflection of the inner body relative to the outer body. Furthermore, a fold is easily deformable and thus forms an expansion or crush zone of the spring member that is able to absorb tensile or compressive stresses. The at least one fold can be configured in a rotationally symmetric or non-rotationally symmetric manner. Furthermore, the elastomer body may have two folds, which preferably form a peripherally extending cavity. Moreover, a bump stop may be disposed in the cavity. By means of the bump stop, a rolling bearing can be elastically supported on the bearing support. If the elastomer body has two folds, each of the folds may have an absorber device. Moreover, only one of the folds may have an absorber device.

In an advantageous embodiment, the absorber device is connected to the elastomer body in such a way that the former is disposed outside the force flow occurring in the elastomer body. In particular, the absorber device is disposed parallel to the force flow. Because the absorber device is located outside the force flow, the elastomer body excited to vibrate is calmed down by the absorber device vibrating. The force flow occurring in the elastomer body runs from the inner body via the elastomer body, particularly the at least one fold, to the outer body. Preferably, the absorber device is connected to the fold in such a way that the former is disposed outside the force flow occurring in the fold.

In an advantageous embodiment, the absorber device is formed from an elastomer. Because the absorber device is made from the same material as the elastomer body, the manufacture of the absorber device can be almost cost-neutral since its material proportion in the elastomer body is low. Furthermore, the absorber device may be formed from a metal or plastic.

In an advantageous embodiment, the absorber device has an annular structure connected to the elastomer body. In particular, the annular structure constitutes a closed annular structure. The annular structure is preferably connected to the fold, wherein a center axis of the annular structure extends concentrically with respect to a center axis of the shaft bearing.

In an advantageous embodiment, the absorber device has tabs connected to the elastomer body. The tabs may be tuned in different ways so that different frequencies or directions can be absorbed. If tuned as a tuning set, which corresponds to an incremental increase, the broadband characteristic of the absorber can be increased by the tabs. Advantageously, the tabs protrude from the elastomer body, in particular perpendicularly. Preferably, the tabs are disposed on the elastomer body at equidistant intervals from each other.

In an advantageous embodiment, the elastomer body has at least two radial webs, wherein the absorber device is connected to the radial webs. Advantageously, at least one tab is linked to each of the radial webs. The radial webs connect a radially inner elastomer portion with a radially outer elastomer portion.

In an advantageous embodiment, at least one mass member is embedded in the absorber device. Due to the embedding of a mass member, which may also be referred to as an insert, the effective mass of the absorber device can be significantly increased without disproportionately increasing production costs. The mass member may be made from plastic or metal. The mass member may be configured as a ring. Preferably, a mass member formed as a ring is used in an absorber device configured as an annular structure. If the absorber device is formed of several tabs projecting from the elastomer body, at least one mass member may be embedded in each of the tabs or, for example, in only every second tab or only in a single tab.

In an advantageous embodiment, the elastomer body is connected to the inner body and/or the outer body by substance-to-substance connection and/or non-positively. Thus, the elastomer body can be pressed into the gap formed between the inner body and the outer body. Moreover, the elastomer body can be bonded radially to the outside of the inner body and radially to the inside of the outer body, by substance-to-substance connection, in particular attached by vulcanization. The inner sleeve and/or the outer sleeve may further be integrated into the elastomer body by vulcanization. In the case of a substance-to-substance connection, the inner sleeve and/or the outer sleeve are preferably provided with openings permeated by the elastomer of the elastomer body.

BRIEF DESCRIPTION OF THE DRAWINGS

The shaft bearing and further features and advantages are explained below with reference to exemplary embodiments that are schematically shown in the Figures. In the Figures.

DETAILED DESCRIPTION

Figure 1:
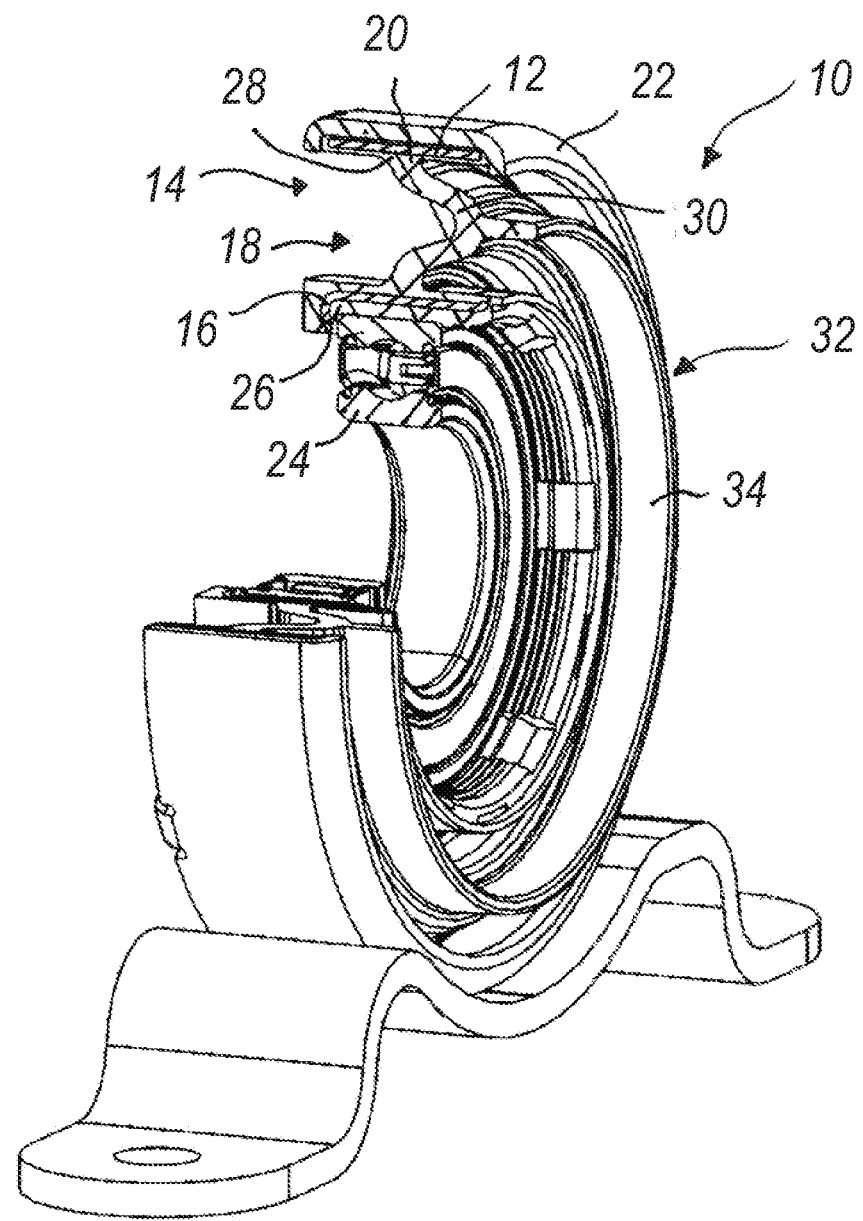
FIG. 1 shows a perspective view of part of a shaft bearing in accordance with a first embodiment.

FIG. 1 shows a shaft bearing 10 according to a first embodiment, which serves for supporting a cardan shaft, which is not shown, of a motor vehicle.

The shaft bearing 10 has an outer body 12 forming an accommodating opening 14, into which an inner body 16 configured as an inner ring is inserted. The outer body 12 and the inner body 16 form an annular gap 18 into which an elastomer body 20 is inserted. In this case, the elastomer body 20 elastically connects the inner body 16 to the outer body 12, so that the inner body 16 is capable of moving relative to the outer body 12.

The shaft bearing 10 further has a bearing support 22 surrounding the outer body 12 on the side of the outer circumference. The shaft bearing 10 is attached via the bearing support 22 to a motor vehicle component, which is not shown, in particular a motor vehicle body. The shaft bearing 10 further has a rolling bearing 24 surrounding the cardan shaft that is not shown. In particular, the elastomer body 20 is supported on the rolling bearing 24 via the inner body 16.

Figure 2:
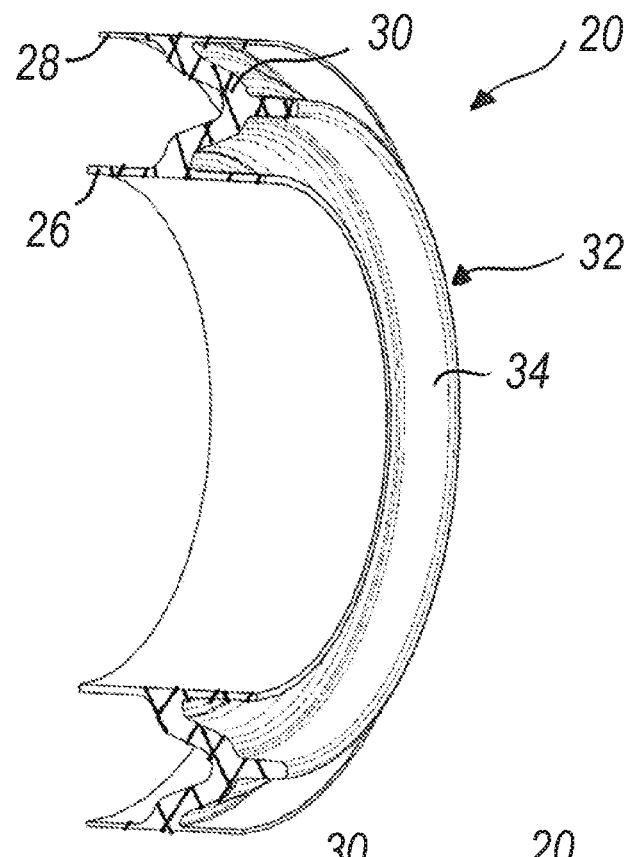
FIG. 2 shows a perspective view of a cross section through the elastomer body with the absorber device shown in FIG. 1 in accordance with a first embodiment.
Figure 3:
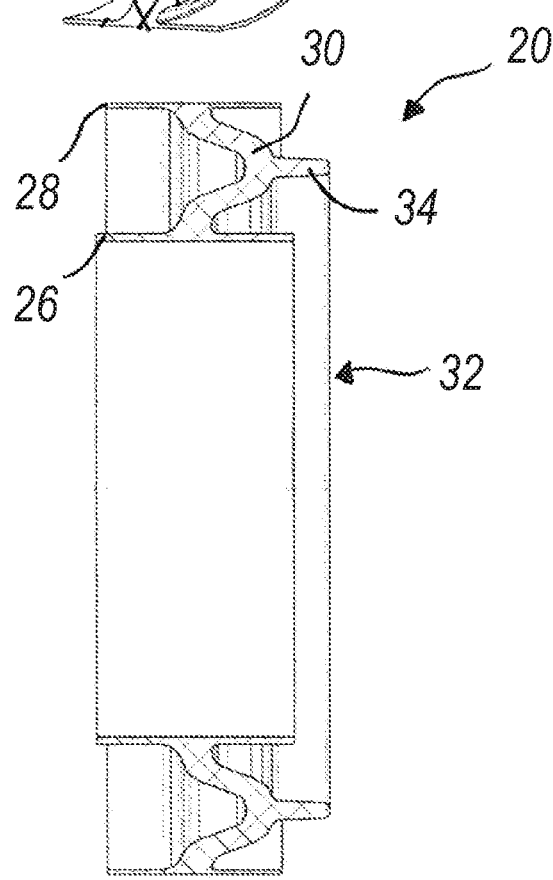
FIG. 3 shows a front view of the cross section shown in FIG. 2.

As is apparent, in particular, from FIGS. 2 and 3, the elastomer body 20 has a radially inner portion 26 connected to the inner body 16 and a radially outer portion 28 connected to the outer body 12, wherein the two portions 26, 28 are connected to each other via a fold 30. Both the inner body 16 and the outer body 12 are embedded in the elastomer body 20, in particular integrated into it by vulcanization.

The elastomer body 20 further has an absorber device 32, which is connected to the fold 30 by substance-to-substance connection, in particular with material uniformity and integrally. According to FIGS. 2 and 3, the absorber device 32 is formed as an annular structure 34 and, in this case, acts as a single-mass oscillator.

The vibrations acting on the cardan shaft during driving are transmitted by the inner body 16 onto the elastomer body 20, wherein the fold 26 begins to vibrate. Because the absorber device 28 is disposed on the elastomer body 20 outside the force flow, the absorber device 28 resonates strongly and thus reduces the mass motions in the fold 26. As a result, the stiffness of the shaft bearing 10 in the target frequency range can be reduced significantly, and the problem of the reduced decoupling function can thus be solved. Thus, the shaft bearing 10 has a sufficient decoupling function even in the high-frequency range. Furthermore, the mass and the frequency of the absorber device 32 can be easily tuned to the problematic range of the elastomer body 20 of the shaft bearing 10 by means of the finite element method. In addition, given a large mass of the absorber device 32, the dynamic stiffness can be lowered in a targeted manner to less than the natural level in a desired frequency range, so that an approximate "bathtub shape" of the dynamic stiffness curve is produced.

Figure 4:
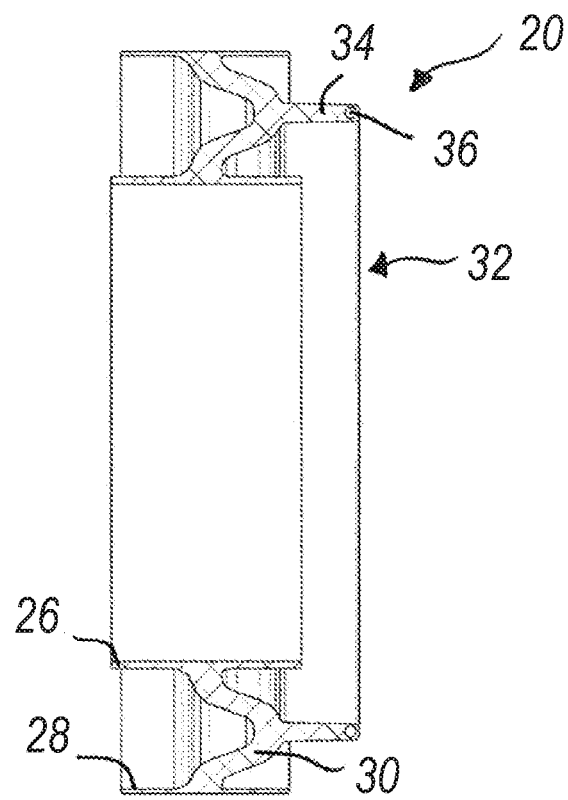
FIG. 4 shows a cross section through an elastomer body with an absorber device according to a second embodiment.

A second embodiment of the absorber device 32 is illustrated in FIG. 4, which differs from the first embodiment in that a mass member 36 is embedded in the absorber device 32. The mass member 36 is formed as a ring 38 and may be made from metal or plastic. The effective mass of the absorber device 28 can be significantly increased by means of the mass member 36, without the increasing production being disproportionately increased thereby.

Figure 5:
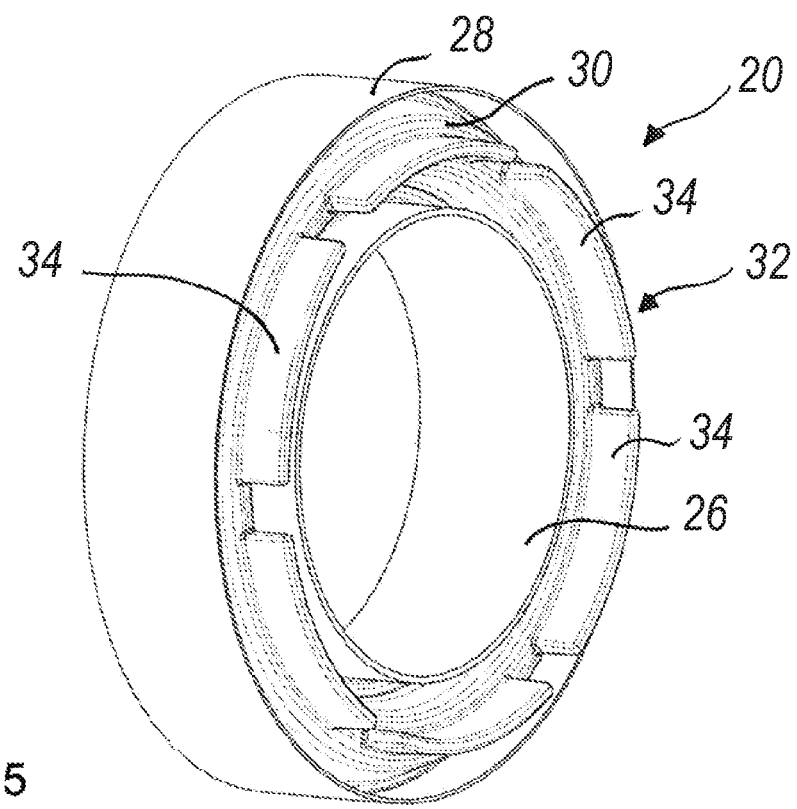
FIG. 5 shows a perspective view of an elastomer body with an absorber device in accordance with a third embodiment.

A third embodiment of the absorber device 28 is illustrated in FIG. 5, which differs from the other two embodiments in that the absorber device 28 has tabs 40, which project from the elastomer body 20 approximately perpendicularly and are disposed at equidistant intervals from each other. The tabs 40 may be tuned in different ways so that different frequencies or directions can be absorbed as a result. Given a tuning as a tuning set, which corresponds to an incremental increase, the broadband characteristic of the absorber 32 can be increased. In addition, a mass member 40 may be embedded in each tab 40 in order to increase effectiveness.

Figure 6:
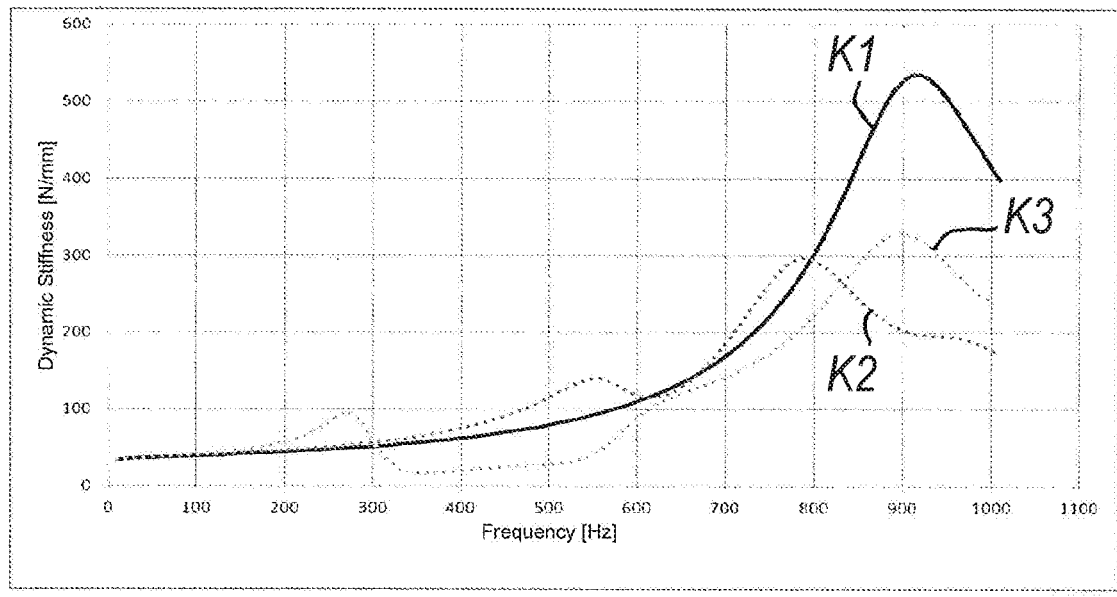
FIG. 6 shows a graphical representation of the curve of the dynamic stiffness over the frequency in a conventional shaft bearing, a shaft bearing with an absorber device according to a first embodiment, and a shaft bearing with an absorber device according to the second embodiment.

FIG. 6 shows a graphical representation of the curve of the dynamic stiffness over the frequency, in particular in the high-frequency range at 920 Hz. The curve labeled K1 shows the course in a conventional shaft bearing without a torsion device 32. The curve labeled K2 shows the course in a shaft bearing 10 with a torsion device 32 according to the first embodiment. The curve labeled K3 shows the course in a shaft bearing 10 with a torsion device 32 according to the second embodiment. As is apparent from the graphical representation, a shaft bearing 10 provided with a torsion device 32 has a lower dynamic stiffness in the high-frequency range, particularly at 920 Hz, as compared to a conventional shaft bearing without a torsion device, because the absorber device 32 reduces the mass motion of the elastomer body 20.

Further embodiments of the shaft bearing 10 will be described below, wherein the reference numerals already used previously will be used, in their description, for identical or functionally identical parts.

Figure 7:
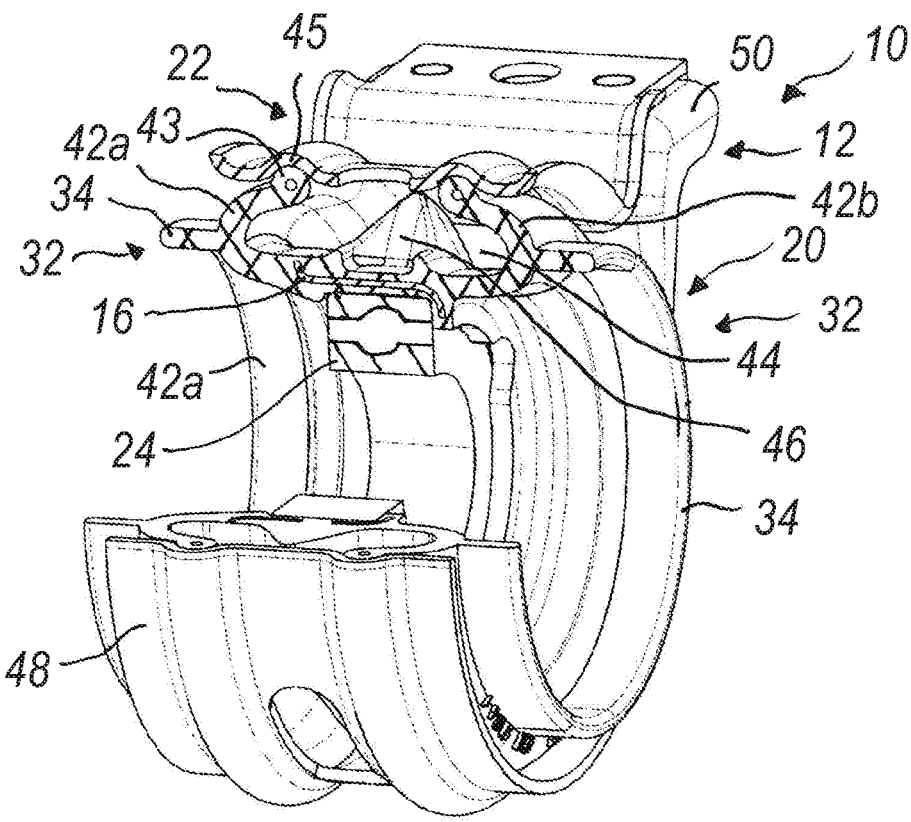
FIG. 7 shows a perspective view of part of a shaft bearing in accordance with a second embodiment.

FIG. 7 shows a second embodiment of a shaft bearing 19, which differs from the first embodiment in the configuration of the elastomer body 20 and the outer body 12, and in the attachment of the elastomer body 20 to the outer body 12.

In the embodiment shown in FIG. 7, the outer body 12 forms the bearing support 22 and is configured as a two-part component. The bearing support 22 has a first bearing support shell 48 and a second bearing support shell 50.

The elastomer body 20 shown in FIG. 7 has two folds 42a, 42b, which define a cavity 44 together with the outer body 12. An absorber device 32, which is configured as an annular structure 34, is connected to each of the folds 42a, 42b. Furthermore, the elastomer body 20 has a peripherally extending bump stop 46 protruding into the cavity 44. The bump stop 46 limits a radial deflection of the inner body 16 and the rolling bearing 24 towards the bearing support 22. Each of the folds 42a, 42b is fixed to the bearing support 22 in a non-positive manner. To this end, each of the folds 42a, 42b has at its end a bead portion 43 with a bead core, which rest in corresponding depressions 45 of the bearing support 22.

Figure 8:
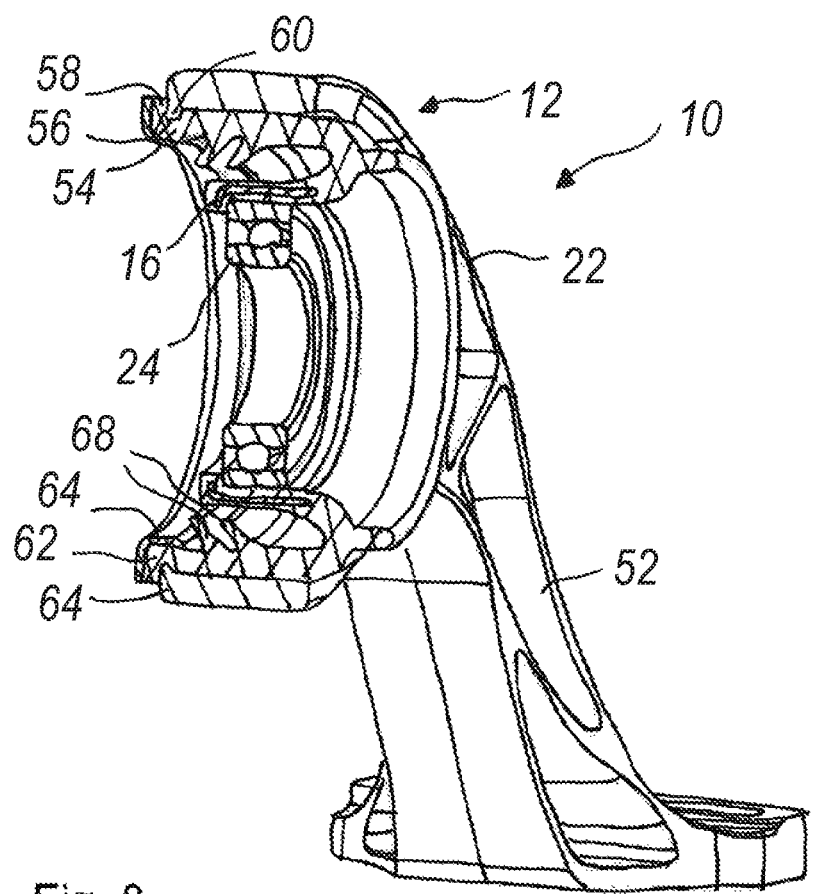
FIG. 8 shows a perspective view of part of a shaft bearing in accordance with a third embodiment.

FIG. 8 shows a third embodiment of a shaft bearing 10, which differs from the first embodiment in the configuration of the outer body 12 and the elastomer body 20, and in the attachment of the elastomer body 20 to the outer body 12.

In the embodiment shown in FIG. 8, the outer body 12 is configured as a bearing support 22 and has a supporting arm 52 for attachment to a motor vehicle component not shown.

In the exemplary embodiment shown in FIG. 8, the elastomer body 20 is configured to be approximately U-shaped and is non-positively fixed to the bearing support 22. For this purpose, the radially outer portion 28 has at its end a fastening portion 54 via which the elastomer body 20 is fixed to the bearing support 22. The fastening portion 54 includes a peripherally extending depression 56 in which a projection 60 protruding from the bearing support 22 rests, and a collar portion 58, which is configured as a leg 62 protruding in the radial direction and abuts against an end face 64 of the bearing support 22. In order to secure the elastomer body 20 against being pulled out of the annular gap 18, a securing ring 66 is clamped onto the fastening portion 54.

Furthermore, the radially outer portion 28 has two radially inwardly protruding lips 68 that limit a radial deflection of the inner body 16 and the rolling bearing 24.

Figure 9:
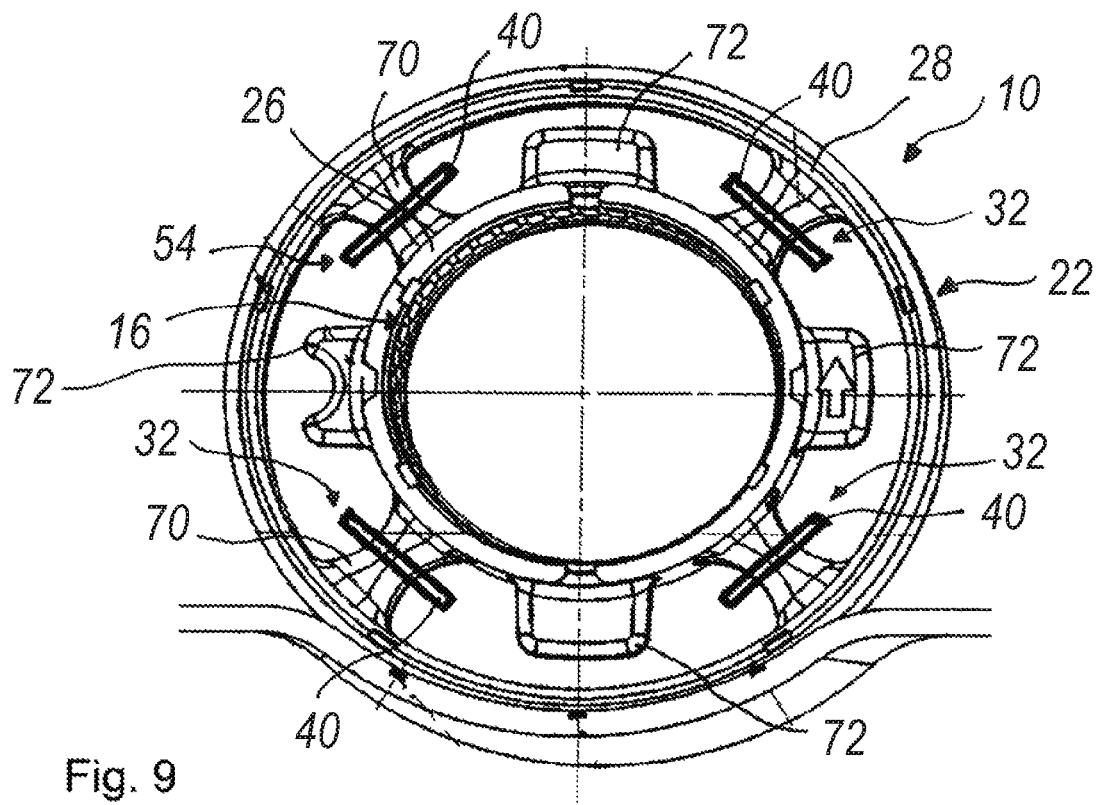
FIG. 9 is front view of a shaft bearing according to a fourth embodiment.

FIG. 9 shows a fourth embodiment of a shaft bearing 10, which differs from the first embodiment in the configuration of the elastomer body 20.

In the elastomer body 20 shown in FIG. 9, the radially inner and outer portions 26, 28 are connected to each other via radial webs 70. Stops 72, which limit a radial deflection of the inner body 16 towards the bearing support 22, are disposed between the radial webs 70. Each of the radial webs 70 is provided with an absorber device 32 configured as a tab 40.

The invention claimed is:

1. A shaft bearing, comprising:
    an inner body;
    an outer body surrounding the inner body at a distance; and
    an elastomer body that elastically connects the inner body and the outer body to each other;
    wherein the elastomer body includes an absorber device, the absorber device comprising an elastomer, and the elastomer body has at least one peripherally extending fold, and the absorber device is connected to the at least one peripherally extending fold.

2. The shaft bearing according to claim 1, wherein the absorber device comprises a single-mass oscillator.

3. The shaft bearing according to claim 1, wherein the absorber device is connected to the elastomer body by a substance-to-substance connection.

4. The shaft bearing according to claim 1, wherein the absorber device is connected to the elastomer body in such a way that the absorber device is disposed outside a force flow occurring in the elastomer body.

5. The shaft bearing according to claim 1, wherein the absorber device has an annular structure connected to the elastomer body.

6. The shaft bearing according to claim 1, wherein the absorber device has tabs connected to the elastomer body.

7. The shaft bearing according to claim 1, wherein at least one mass member is embedded in the absorber device.

8. The shaft bearing according to claim 1, wherein the elastomer body is connected to the inner body and/or the outer body by substance-to-substance connection.

9. The shaft bearing according to claim 1, wherein the elastomer body is connected to the inner body and the outer body non-positively.

10. A shaft bearing, comprising:
an inner body;
an outer body surrounding the inner body at a distance; and
an elastomer body that elastically connects the inner body and the outer body to each other;
wherein the elastomer body includes an absorber device, the absorber device having tabs connected to the elastomer body.

11. A shaft bearing, comprising:
an inner body;
an outer body surrounding the inner body at a distance; and
an elastomer body that elastically connects the inner body and the outer body to each other;
wherein the elastomer body includes an absorber device, and at least one mass member is embedded in the absorber device.

* * * * *